United States Patent [19]
Gibbon et al.

[11] 3,846,506
[45] Nov. 5, 1974

[54] RAPID CURING ORGANOPOLYSILOXANE COMPOSITIONS

[75] Inventors: Robert Muir Gibbon, West Kilbride; Edward Keith Pierpoint, Largs, both of Scotland

[73] Assignee: Imperial Chemical Industries Limited, London, England

[22] Filed: Nov. 9, 1973

[21] Appl. No.: 414,522

Related U.S. Application Data

[63] Continuation of Ser. No. 847,746, Aug. 5, 1969, abandoned.

[30] Foreign Application Priority Data
Aug. 21, 1968 Great Britain .................. 40019/68

[52] U.S. Cl...... 260/825, 260/33.6 SB, 260/46.5 G, 117/155 R, 117/161 ZA
[51] Int. Cl...................... C08g 47/04, C08g 47/10
[58] Field of Search............... 260/825, 46.5 G, 33.6

[56] References Cited
UNITED STATES PATENTS

| | | | |
|---|---|---|---|
| 3,524,900 | 8/1970 | Gibbon et al. | 260/825 |
| 3,527,728 | 9/1970 | Gibbon et al. | 260/825 |
| 3,565,838 | 2/1971 | Atkinson et al. | 260/825 |

*Primary Examiner*—Wilbert J. Briggs, Sr.
*Attorney, Agent, or Firm*—Cushman, Darby & Cushman

[57] ABSTRACT

Rapid curing compositions particularly suitable for the surface treatment of paper comprising a diorganopolysiloxane having at least 2 hydroxyl groups attached to different silicon atoms per molecule, an organohydrogen-polysiloxane, an amino-alkoxy silicon compound and a tin compound of the general formula $YO(R_2SnO)_nY$ where R is an alkyl group having not more than 20 carbon atoms, Y is $R'R''C=N-$ or $R'''$ where $R'$ is a hydrocarbyl group or hydrogen and $R''$ and $R'''$ are hydrocarbyl groups and n is 1, 2 or 3, in an organic solvent.

10 Claims, No Drawings

RAPID CURING ORGANOPOLYSILOXANE COMPOSITIONS

This is a continuation of application Ser. No. 847,746 filed Aug. 5, 1969, and now abandoned.

This invention relates to new and useful surface-treating compositions and more particularly to such compositions based on organopolysiloxanes.

A wide variety of compositions suitable for use in surface treatments of materials such as woven, felted or knitted fabrics of natural or synthetic fibres and which are based on organopolysiloxanes are known and are readily available. For some of these applications, including the treatment of paper, it is desirable that the compositions used should have a rapid rate of cure at not too high a temperature and should be resistant to removal by abrasion immediately after curing. While many compositions are available which give a rapid cure, the hitherto available compositions, especially when applied to paper, have had little resistance to removal by abrasion immediately after curing although such resistance has in some cases developed later.

In our copending application No. 24226/66 are described new and improved compositions not having these disadvantages. The present invention is an improvement in or modification of that described in our said copending application.

According to the present invention a new and improved composition for use in surface treatments comprises 100 parts by weight of a diorganopolysiloxane having at least two hydroxyl groups attached to different silicon atoms per molecule and of viscosity not less than 3000 cS. at 25°C, 1 to 20 parts by weight of a mono-organopolysiloxane of viscosity not greater than 1,000 cS. at 25°C, 1 to 20 parts by weight of an aminoalkoxy silicon compound and 5 to 20 parts by weight of a tin compound of the general formula $YO(R_2SnO)_nY$ where R is an alkyl group having not more than 20 carbon atoms, Y is $R'R''C=N-$ or $R'''$ where $R'$ is a hydrocarbyl group or hydrogen and $R''$ and $R'''$ are hydrocarbyl groups and $n$ is 1, 2 or 3, in an organic solvent.

It is preferred in some cases, for example, when maximum ease of release is required, that the viscosity of the diorganopolysiloxane be not less than 500,000 cS. at 25°C. If there are present, as there may be, more than two hydroxyl groups per molecule, two or more of these may be attached to the same silicon atom always provided that there are at least two hydroxyl groups attached to different silicon atoms. It is also preferred that there be a hydroxyl group attached to each terminal silicon atom in the chain.

The diorganopolysiloxane while consisting essentially of diorganosiloxanyl units may also contain a small proportion of trifunctional silicon atoms attached to a single organo group provided the amount of such is not sufficient to destroy the solubility of the diorganopolysiloxane in the chosen organic solvent. The organo groups in the diorganopolysiloxane may be alkyl, aryl, aralkyl, alkaryl, alkenyl, cycloalkyl or cycloalkenyl groups or such groups containing a variety of substituents such as halogens or cyano groups. Suitable groups include, for example, methyl, ethyl, phenyl, vinyl, cyclohexyl, 3,3,3-trifluoropropyl and chlorophenyl groups. In many cases it is preferred that at least the major proportion and, in some cases, all, of the organo groups, are methyl groups.

The mono-organopolysiloxane is normally preferably used in amount not less than 3 parts by weight. It may be linear or cyclic or be a mixture of both. The mono-organopolysiloxane may, if desired, also contain a proportion, preferably not more than a minor proportion, of diorganosiloxanyl units, but should contain at least one silicon-bonded hydrogen atom for every three silicon atoms. If linear it may be terminated by, for example, triorganosilyl groups.

The organo groups in the mono-organopolysiloxane may be alkyl, aryl, aralkyl, alkaryl, alkenyl, cycloalkyl or cycloalkenyl groups. Suitable groups which may be used include, for example, methyl, ethyl, phenyl, tolyl, benzyl and vinyl groups. Preferred siloxanes are those consisting of methylhydrogensiloxanyl units terminated by trimethylsilyl groups.

The aminoalkoxy silicon compound is preferably used in amount from 3 to 10 parts by weight. The aminoalkoxy silicon compound may be any silicon compound having one or more of the groups $(R^4R^5N.R^8-)$ attached to one or more silicon atoms through an oxygen atom, where $R^8$ is an alkylene group or consists of alkylene groups joined by one or more $-NR^6-$ groups or oxygen atoms and the oxygen atom attached to silicon and the essential nitrogen atom being attached to different carbon atoms and $R^4$ and $R^5$, which may or may not be the same, are hydrogen or alkyl, cycloalkyl, aminoalkyl or hydroxy-alkyl groups, monovalent groups consisting of alkylene and alkyl groups joined by one or more $-NR^5-$ groups or oxygen atoms or alternatively $R^4$ and $R^5$ together from a single alkylene group or a group consisting of alkylene groups joined by one or more $-NR^6-$ groups or oxygen atoms and $R^6$ is hydrogen or an alkyl group having not more than 5 carbon atoms. It is preferred that $R^8$ be $-CH_2CH_2-$ or $-CH_2CH(Et)-$ and that $R^4$ and $R^5$ be hydrogen, methyl or ethyl groups. Because of low cost and availability, the more generally preferred group is $NH_2CH_2CH_2-$.

Suitable groups which may be attached to a silicon atom through an oxygen atom to form aminoalkoxy silicon compounds include, for example, $-CH_2CH_2NH_2$, $-CH_2CH_2NH.CH_3$, $-CH_2CH_2N(CH_3)_2$, $-CH_2CH_2N(C_2H_5)_2$, $-CH_2CH_2CH_2NH_2$, $-CH_2CH(CH_3)NH_2$, $-CH(CH_3)CH_2NH_2$,

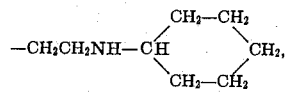

$-CH_2CH(C_2H_5)NH_2$, $-(CH_2)_6NH_2$, $-CH_2CH_2NHC_8H_{17}$, $-CH_2CH_2NHC_{18}H_{37}$, $-CH_2Ch_2NHCH_2C_6H_5$, $-CH_2CH_2OCH_2CH_2NH_2-CH_2CH_2OCH_2CH_2N(CH_3)_2$, $-CH_2CH_2NHCH_2CH_2NH_2$, $-CH_2CH_2N(CH_3)CH_2CH_2NH_2$, $-CH_2CH_2N(CH_2CH_2OH)_2$, $-CH_2CH_2\underline{NCH_2CH_2CH_2CH_2CH_3}$, $-CH_2CH_2\underline{NCH_2CH_2OCH_2CH_2}$ and $-CH_2CH_2\underline{NCH_2CH_2NHCH_2CH_2}$.

The aminoalkoxy silicon compound may be, for example, an aminoalkoxy silane, an aminoalkoxydisilane, an aminoalkylsilicate, an amino-alkyl polysilicate, an amino-alkoxy organopolysiloxane, an amino-alkoxy silphenylene or an aminoalkoxysilmethylene. Suitable compounds include, for example, MeSi- $(O.CH_2CH_2NH_2)_3$; $Me_2Si(OCH_2CH_2NMe_2)_2$; $Me_3Si-O.CH_2CH_2NH_2$; $PhSi(OCH_2CH[Et]NH_2)_3$; $(EtNH.CH_2CH_2O)_3Si.CH_2Si(O.CH_2CH_2NHEt)_3$; $(H_2N.CH_2CH_2O)_3Si.CH_2CH_2Si(O.CH_2CH_2NH_2)_3$; $(H_2N.CH_2CH_2O)_3Si.C_6H_4.Si(OCH_2CH_2NH_2)_3$; $CH_2=CH.Si(O.CH_2CH_2OCH_2CH_2NH_2)_3$; $(H_2N.CH_2CH_2O)_2SiMe.(OCH_2CH_2NH_2)_2$; $H_2N.CH_2CH_2OSi.Me_2.SiMe(O.CH_2CH_2NH_2)_2$; $Si(O.CH_2CH_2NH_2)_4$;

$C_{14}H_{29}Si(O.CH_2NH_2)_3$; $Me_3SiO(SiMe[O.CH_2CH_2CH_2NH_2]O)_{50}SiMe_3$; $(H_2N.CH_2CH_2O.SiMe_2)_2O$; $Me_3SiO(SiMe[O.CH_2CH_2NH_2]O)_{40}(SiMe_2O)_{58}SiMe_3$; and $Me_3SiO(SiMe[O.CH_2CH_2NH_2]O)_{25}(SiMe[OBu]O)_{25}SiMe_3$.

The preferred aminoalkoxysilicon compounds are those of average general formula $$R_a^7(R^4R^5NR^8O)_bSiO_{(4-a-b)/2}$$

where $R^7$ is a hydrocarbyl or hydrocarbyloxy group, $R^8$, $R^4$ and $R^5$ are as defined above, a is any number from 0 to 2, b is any number from 0.1 to 4, a + b is not greater than 4 and not less than 1.95, and the total number of carbon atoms in the groups $R^8$, $R^4$, $R^5$ and $R^7$ is not greater than 24. The group $R^7$ may be alkyl, aryl, aralkyl, alkaryl, alkenyl, alkoxy, aralkyloxy or such groups containing substituents. Suitable groups include, for example, methyl, ethyl, vinyl, phenyl, chlorophenyl, fluoropropyl, benzyl, tolyl, methoxy, ethoxy butoxy, and phenoxy groups.

In general the most preferred aminoalkoxy silicon compounds are the aminoethoxymethylpolysiloxanes, where $R^7$ is a methyl group, a is 1.0 to 1.8, b is 0.3 to 1.0 and a + b is not less than 2.0.

When the amino-alkoxy compound is an aminoalkoxypolysiloxane this may be prepared in any one of a variety of ways. In one method an amino-alcohol is reacted with an organopolysiloxane containing a proportion of silicon bonded hydrogen atoms, preferably one of viscosity not greater than 100 cS. at 25°C. Amino-alcohols which may be used for this process include, for example, 2-aminoethanol, 1-aminopropan-2-ol, 2-aminopropan-1-ol, 3-aminopropan-1-ol, 2-amino-2-methylpropan-1-ol, 2-aminobutan-1-ol, 2-methylaminoethanol, aminooctanol, aminooctadecanol, 2-(N,N-diethylamino)ethanol, 2-(2-aminoethoxy)-ethanol, 2-(2-aminoethylamino)-ethanol, N-(2-hydroxyethyl) - cyclohexylamine and 2-(N benzylamino)ethanol. Organopolysiloxanes which may be used for the preparation of the aminoalkoxypolysiloxanes by this method include, for example, tetramethyldisiloxane, tetramethylcyclotetrasiloxane, pentamethylcyclopentasiloxane, hexamethylcyclohexasiloxane and those of average general formula, $Me_3SiO(MeHSiO)_3(Me_2SiO)_{15}SiMe_3$, $Me_3SiO(MeHSiO)_{40}(Me_2SiO)_{58}SiMe_3$, $Me_3SiO(MeHSiO)_{50}SiMe_3$, $Me_3SiO(MeHSiO)_{25}[Me(OBu)SiO]_{25}SiMe_3$ and $Me_3SiO(MeHSiO)_{40}[Me(OEt)SiO]_{10}SiMe_3$.

Another convenient method of producing the aminoalkoxypolysiloxanes is by transesterification of an alkoxypolysiloxane with an aminoalcohol. Such transesterification can be carried out very readily at elevated temperatures at which the displaced alcohol distils from the reaction mixture.

A further method of producing the aminoalkoxypolysiloxanes is by the controlled hydrolysis of an organo-(aminoalkoxy) silane either alone or with an aminoalkyl silicate.

When the aminoalkoxy compound is a silane, disilane, silmethylene, silethylene, silphenylene, silicate or polysilicate, it may conveniently be prepared by transesterification of a suitable silicon alkoxy compound with the desired aminoalcohol.

The tin compound may be used in amount from 5 to 20 parts by weight per 100 parts by weight of the diorganopolysiloxane. It is in general preferred that it should be used in amount from 5 to 10 parts by weight. The group R may be any alkyl group having not more than 20 carbon atoms, for example methyl, ethyl, propyl, butyl, octyl, decyl, didecyl, tetradecyl and octadecyl. It is however normally preferred that the group R be a butyl or octyl group. The group R' when not hydrogen and the groups R'' and R''' may be alkyl, aryl, aralkyl, alkaryl, or cycloalkyl, alkenyl or cycloalkenyl groups. Suitable groups include, for example, methyl, ethyl, propyl, butyl, hexyl, cyclohexyl, phenyl, tolyl, and benzyl groups. It is in general preferred that at least one of the groups R' and R'' be a phenyl group and it is further preferred that R' be hydrogen and that R'' be a phenyl group. It is also preferred that R'' be a butyl or phenyl group.

The compositions can be cured to hard abrasion-resistant abhesive films by exposure to temperature of 150°C or higher, for a few seconds or to lower temperatures for longer periods, for example some 15 seconds at 120°C or about 1 minute at 70°C. The temperature selected for curing will, of course, depend on the application for which the particular composition is being used and the speed of curing can be varied widely by varying the nature and proportions of the constituents. Thus these compositions can be used and are particularly valuable for use in processes such as paper treating which can be carried out continuously at high speeds, for example speeds of up to 500 ft./minute can be used where it is possible to give a dwell time of some 15-30 seconds in a heating zone at 110°-120°C.

The compositions can also be used to form abhesive films on a wide variety of other substrates, for example on polyolefin or polyester films such as polypropylene or polyethyleneterephthalate and on metals such as aluminum, glass and ceramics.

Our invention is further illustrated by the following Examples in which all parts and percentages are by weight.

EXAMPLE 1

A number of compositions were made up consisting of:

|  | parts |
|---|---|
| Polysiloxane solution in toluene | 66.5 |
| Poly(aminoethoxy)methylsiloxane solution | 0.7 |
| Organotin compound | x |

| | Organotin compound | x parts of solution | Cure sec/ 120°C |
|---|---|---|---|
| A | Dibutyldibenzaldoximotin | 1.0 | 30 |
| B | Tetrabutyldibenzaldoximodistannoxane | 0.7 | 30 |
| C | Octabutyldibenzaldoximotetrastannoxane | 1.4 | 30 |

|   |   |   |   |
|---|---|---|---|
| D | Dioctyldibenzaldoximotin | 1.15 | 30 |
| E | Dibutyldiacetaldoximotin | 0.9 | 60 |
| F | Dibutyldiacetoximotin | 0.73 | 60 |
| G | Dibutyldibenzophenoximonitin | 1.2 | 30 |
| H | Dibutyldiacetophenoximotin | 1.0 | 60 |

The compositions were coated on to a vegetable parchment paper such that the weight of siloxane deposited on the paper was between 0.5 and 1.0 g./m². The coated papers were heated at 120°C in air for 30 seconds or 1 minute. All the compositions gave non-smearing coatings which were most resistant to abrasion with a finger and which gave excellent release of pressure sensitive adhesives. The papers coated with compositions E, F and H required cures in excess of 30 seconds at 120°C before they became smear-free immediately upon removal from the curing oven. In addition all the compositions cured at room temperature within 1–2 hours to give abrasion resistant release coatings on paper.

The polysiloxane solution contained 7.5 per cent of a mixture of 100 parts of a hydroxy-ended dimethylpolysiloxane of viscosity $1 \times 10^7$ cS. at 25°C and 6 parts of a trimethylsilylended methylhydrogenpolysiloxane of viscosity 40 cS. at 25°C.

PREPARATION OF AMINO-ETHOXYPOLYSILOXANE

A mixture of 122 parts of ethanolamine and 122 parts of toluene was stirred at 22°C and 120 parts of a linear methylpolysiloxane of viscosity 20 cS. at 25°C, prepared by the cohydrolysis of 3.5 parts of trimethylchlorosilane and 96.5 parts of methyldichlorosilane, added slowly thereto over a period of 2 hours. A vigorous evolution of hyrogen ensued and the reaction mixture became warm. A further 120 parts of toluene were added after completion of the addition of the methylpolysiloxane and the mixture stirred for a further 3 hours. The solution so obtained contained 50 per cent of the aminoethoxypolysiloxane.

The oximotin solutions used were prepared in the manner described below. All of the solutions contained 50 per cent by weight of the tin compound.

A. Preparation of dibutyldibenzaldoximotin (Bu$_2$Sn-(O.N=CHPh)$_2$)

12.5 parts of dibutyltin oxide, 12.1 parts of benzaldoxime and 24.6 parts of toluene were heated under reflux and the water formed (0.8 part) removed by azeotropic distillation. The clear yellow solution so obtained was used as such.

B. Preparation of tetrabutyldibenzaldoximodistannoxane (PhCH=N.O.Sn(Bu)$_2$O.Sn(Bu)$_2$.ON=CHPh)

25 parts of dibutyltin oxide, 12.1 parts of benzaldoxime and 37.2 parts of toluene were heated under reflux. The water formed (0.9 part) was removed by azeotropic distillation. The so obtained solution was a clear yellow colour and was used as such.

C. Preparation of octabutyldibenzaldoximo-tetrastannoxane (PhCH=N.O.Sn(Bu)$_2$.(OSn(Bu)$_2$)$_2$.OSn(Bu)$_2$.O.N=CHPh)

25 parts of dibutyltin oxide, 6.0 parts of benzaldoxime and 93 parts of toluene were heated under reflux with azeotropic distillations of this water formed. The oxide slowly dissolved to give a clear yellow solution.

D. Preparation of dioctyldibenzaldoximotin ((C$_8$H$_{17}$)$_2$Sn(ON=CHC$_6$H$_5$)$_2$)

36.3 parts of dioctyltin oxide, 24.2 parts of benzaldoxime and 60.5 parts of toluene were heated under reflux. 1.7 parts of water were removed by azeotropic distillation. The clear yellow solution so obtained was used as such.

E. Preparation of dibutyldiacetaldoximotin (Bu$_2$Sn-(O.N=CH.CH$_3$)$_2$)

25 parts of dibutyltin oxide, 11.8 parts of acetaldoxime and 36.8 parts of toluene were heated under reflux. The water formed, 1.7 parts, was removed by azeotropic distillation. The clear solution so obtained was used as such.

F. Preparation of dibutyldiacetoximotin (Bu$_2$Sn-(O.N=C(CH$_3$)$_2$)$_2$)

25 parts of dibutlytin oxide, 14.6 parts of acetoxime and 39.6 parts of toluene were heated under reflux. The water formed was removed by azeotropic distillation. The clear solution so obtained was used as such.

G. Preparation of dibutyldi(benzophenoximo)tin (Bu$_2$Sn(O.N=C.Ph$_2$)$_2$)

25 parts of dibutyltin oxide, 20 parts of benzophenoxime and 45 parts of toluene were heated under reflux and the 1.7 parts of water formed removed by azeotropic distillation. The clear solution obtained was used as such.

H. Preparation of dibutyldiacetophenoximotin (Bu$_2$Sn-(ON=CCH$_3$.Ph))

10 parts of dibutlytin oxide, 12.2 parts of acetophenoxime and 22.2 parts of toluene were heated under reflux and the water formed removed as the azeotrope with toluene.

EXAMPLE 2

Three further compositions were made up identical with those of Example 1 except for the identity and amount of the tin compound which was as given in the table below.

|   | Organotin compound | Parts solution |
|---|---|---|
| I | Dibutyltin diphenoxide | 1.0 |
| J | Dibutyltin di-n-butoxide | 0.8 |
| K | Dibutyltin di-n-octoxide | 1.0 |

The solutions were coated on to vegetable parchment paper and cured in air at 120°C for 30 seconds. The coatings obtained from compositions I and J were smear free and highly resistant to abrasion by a finger. The coating obtained from composition K initially smeared upon rubbing with a finger but became smear free and abrasion resistant within a further 1 hour at room temperature. All the coatings gave good release of pressure sensitive adhesives.

The solutions of tin compound were prepared as follows:

I. Preparation of dibutyltin diphenoxide (Bu$_2$Sn-(O.Ph)$_2$)

25 parts of dibutyltin oxide, 18.8 parts of phenol and 43.8 parts of toluene were heated under reflux and the water formed removed as the azeotrope with toluene. The 50 per cent solution so obtained was used as such.

J. Preparation of dibutyltin di-n-butoxide (Bu$_2$Sn-(OBu)$_2$)

50 parts of dibutyltin oxide, 30 parts n-butanol and 80 parts of toluene were heated under reflux and the water formed removed as the azeotrope with toluene. The 50 per cent solution formed was used as such.

K. Preparation of dibutyltin di-n-octoxide ($Bu_2Sn(O.Oct)_2$)

25 parts dibutyltin oxide, 26 parts n-octanol and 51 parts toluene were refluxed together and the water removed as the azeotrope with toluene. The 50 per cent solution so formed was used as such.

What we claim is:

1. A composition comprising 100 parts by weight of a diorganopolysiloxane having at least two hydroxyl groups attached to different silicon atoms per molecule and of viscosity not less than 3,000 cS at 25°C., 1 to 20 parts by weight of an organohydrogen-polysiloxane of viscosity not greater than 1,000 cS at 25°C. and having at least one silicon-bonded hydrogen atom for every three silicon atoms, the organo groups in the said siloxanes being selected from the group consisting of alkyl, aryl, aralkyl, alkenyl, cycloalkyl and cycloalkenyl groups, 1 to 20 parts by weight of an aminoalkoxy silicon compound of the general formula $$R_a^7(R^4R^5NR^8O)_b SiO_{(4-a-b)/2}$$

where $R^4$ and $R^5$, which may or may not be the same, are hydrogen or alkyl, cycloalkyl, aminoalkyl or hydroxyalkyl groups, $R^7$ is a hydrocarbyl or hydrocarbyloxy group, $R^8$ is an alkylene group or consists of alkylene groups joined by $NR^6$ groups or oxygen atoms where $R^6$ is hydrogen or an alkyl group having not more than 5 carbon atoms, a is a number from 0 to 2, b is a number from 0.1 to 4, a + b is not greater than 4 and not less than 1.95 and the total number of carbon atoms in the groups $R^8$, $R^4$, $R^5$ and $R^7$ is not greater than 24, and 5 to 20 parts of a tin compound of the general formula $$YO(R_2SnO)_nY$$

where R is an alkyl group having not more than 20 carbon atoms, Y is $R'R''C=N-$ where $R'$ is a hydrocarbyl group or hydrogen and $R''$ is a hydrocarbyl group, and n is 1, 2 or 3, in an organic solvent.

2. A composition according to claim 1 wherein the viscosity of the diorganopolysiloxane is not less than 500,000 cS at 25°C.

3. A composition according to claim 1 wherein the organo groups in the organopolysiloxanes are selected from the group consisting of alkyl, aryl, aralkyl, alkaryl, alkenyl, cycloalkyl and cycloalkenyl groups.

4. A composition according to claim 1 wherein at least a major proportion of the organo groups in the diorganopolysiloxane are methyl groups and the organohydrogen-polysiloxane is a trimethylsilyl-ended methylhydrogenpolysiloxane.

5. A composition according to claim 1 wherein the organohydrogen-polysiloxane is present in amount not less than 3 parts by weight the aminoalkoxy silicon compound is present in amount from 3 to 10 parts by weight and the tin compound is present in amount from 5 to 10 parts by weight all per 100 parts by weight of the diorganopolysiloxane.

6. A composition according to claim 1 wherein $R^7$ is a methyl group, $(R^4R^5NR^8O)$ is an aminoethoxy group, a is a number from 1.0 to 1.8, b is a number from 0.3 to 1.0 and a + b is not less than 2.0.

7. A composition according to claim 1 wherein the tin compound the group $R'$ is hydrogen, the group $R''$ is a phenyl group and the group $R'''$ is selected from the group consisting of butyl and phenyl groups.

8. Abhesive films prepared by curing a composition as claimed in claim 1.

9. A film as claimed in claim 8 wherein the curing is from 1 minute at 70°C. to 15 seconds at 120°C.

10. A film as claimed in claim 8 wherein the curing is from 15 to 30 seconds at from 110° to 120°C.

* * * * *